United States Patent
Xiong

(10) Patent No.: US 9,125,250 B1
(45) Date of Patent: Sep. 1, 2015

(54) CONSTANT CURRENT CONTROL BASED ON INDIRECT CURRENT SENSING FOR CRITICAL CONDUCTION MODE BUCK CONVERTER

(71) Applicant: Universal Lighting Technologies, Inc., Madison, AL (US)

(72) Inventor: Wei Xiong, Madison, AL (US)

(73) Assignee: Universal Lighting Technologies, Inc., Madison, AL (US)

( * ) Notice: Subject to any disclaimer, the term of this patent is extended or adjusted under 35 U.S.C. 154(b) by 345 days.

(21) Appl. No.: 13/864,563

(22) Filed: Apr. 17, 2013

Related U.S. Application Data

(60) Provisional application No. 61/625,458, filed on Apr. 17, 2012.

(51) Int. Cl.
*H05B 37/00* (2006.01)
*H05B 37/02* (2006.01)
*H02M 3/156* (2006.01)

(52) U.S. Cl.
CPC .............. *H05B 37/02* (2013.01); *H02M 3/156* (2013.01)

(58) Field of Classification Search
None
See application file for complete search history.

(56) References Cited

U.S. PATENT DOCUMENTS

2013/0148396 A1* 6/2013 Walters .......................... 363/126
2014/0111170 A1* 4/2014 Shi et al. ........................ 323/271

* cited by examiner

*Primary Examiner* — Long Nguyen
(74) *Attorney, Agent, or Firm* — Patterson Intellectual Property Law, P.C.; Mark J. Patterson

(57) ABSTRACT

A light fixture includes a converter operable to drive a light source of the light fixture. The buck converter is operable to provide a predetermined average current to the light source or load. A switch of the buck converter is located in the low side of the buck converter such that a controller of the buck converter may drive the switch directly without the use of an isolation transformer. The buck converter controls operation of the switch based on current through the switch and current through the primary inductor of the buck converter.

20 Claims, 3 Drawing Sheets

CONSTANT CURRENT CONTROL BASED ON INDIRECT CURRENT SENSING FOR CRITICAL CONDUCTION MODE BUCK CONVERTER

A portion of the disclosure of this patent document contains material that is subject to copyright protection. The copyright owner has no objection to the reproduction of the patent document or the patent disclosure, as it appears in the U.S. Patent and Trademark Office patent file or records, but otherwise reserves all copyright rights whatsoever.

CROSS-REFERENCES TO RELATED APPLICATIONS

This application claims priority to and benefit of U.S. Provisional Patent Application Ser. No. 61/625,458 filed Apr. 17, 2012, entitled "CONSTANT CURRENT CONTROL BASED ON INDIRECT CURRENT SENSING FOR CRITICAL CONDUCTION MODE BUCK CONVERTER" which is incorporated by reference in its entirety.

STATEMENT REGARDING FEDERALLY SPONSORED RESEARCH OR DEVELOPMENT

Not Applicable

REFERENCE TO SEQUENCE LISTING OR COMPUTER PROGRAM LISTING APPENDIX

Not Applicable

BACKGROUND OF THE INVENTION

The present invention relates generally to constant current driver circuits. More particularly, this invention pertains to improved buck converters for driving light emitting diodes (LEDs) to emit light from a light fixture.

Compared to incandescent lamps and fluorescent lamps, LED lighting has a longer useful life and superior dimming capability. That is, dimming an LED light source will not affect the life span of the LED light source. Thus, as the cost of LED lighting decreases, LED lighting is becoming the lighting of choice for most applications.

Referring to FIG. 1, an LED light source 104 needs a constant current driver circuit to provide a consistent level of light output. A buck converter 100 is the basis for most constant current LED driver circuits. The switch 102 (e.g., a MOSFET) in the conventional buck converter 100 is on the high side floating. A controller 106 of the converter 100 is typically an average current control integrated circuit that needs to be referred to the ground of the converter to sense the average current through the load (i.e., the LED light source 104). Thus, an isolation transformer is required for the controller 106 to turn the switch 102 on and off. The primary winding 108 of the isolation transformer is connected between a gate drive output of the controller 106 and a ground of the converter 100. The secondary winding 110 of the isolation transformer is connected between a control terminal of the switch 102 and a low side of the switch 102. A high side of the switch 102 is connected to a positive input of the converter 100. Eliminating the isolation transformer would reduce the cost, size, and complexity of the converter 100.

BRIEF SUMMARY OF THE INVENTION

Aspects of the present invention provide a buck converter operable to provide a constant current to a load without an isolation transformer connecting a gate drive output of a controller of the converter to a control terminal of a switch of the converter.

In one aspect, a buck converter is operable to provide a predetermined average current to a load and includes a primary inductor, a primary inductor current integrator circuit, a switch, and a controller. The primary inductor is connected between a positive input of the converter and first load terminal. The primary inductor current integrated circuit senses current through the primary inductor, provides a primary inductor current signal indicative of the current through the primary inductor, and induces, in the primary inductor, a current equal to an integral of the sensed current through the primary inductor. The switch is connected between the load and a ground input of the converter. The controller receives the primary inductor current signal and controls the switch as a function of the primary inductor current signal. Controlling the switch includes turning the switch on and off. The switch conducts current through the switch when turned on, and substantially prevents current flow through the switch when turned off.

In another aspect, a light fixture is operable to connect to a power source and provide light. The light fixture includes a housing, a light source, and a buck converter. The light source is supported by the housing and is operable to provide light in response to receiving current. The buck converter is also supported by the housing and is operable to provide a predetermined average current to the light source. The buck converter includes a primary inductor, a primary inductor current integrator circuit, a switch, and a controller. The primary inductor is connected between a positive input of the converter and the light source. The primary inductor current integrated circuit is operable to sense current through the primary inductor, provide a primary inductor current signal indicative of the current through the primary inductor, and induce, in the primary inductor, a current equal to an integral of the sensed current through the primary inductor. The switch is connected between the light source and a ground input of the converter. The controller is operable to receive the primary inductor current signal and control the switch as a function of the primary inductor current signal. Controlling the switch includes turning the switch on and off. The switch is operable to conduct current through the switch when turned on, and the switch is operable to substantially prevent current flow through the switch when turned off.

BRIEF DESCRIPTION OF THE SEVERAL VIEWS OF THE DRAWINGS

Reference will now be made in detail to optional embodiments of the invention, examples of which are illustrated in accompanying drawings. Whenever possible, the same reference numbers are used in the drawing and in the description referring to the same or like parts.

DETAILED DESCRIPTION OF THE INVENTION

While the making and using of various embodiments of the present invention are discussed in detail below, it should be appreciated that the present invention provides many applicable inventive concepts that can be embodied in a wide variety of specific contexts. The specific embodiments discussed herein are merely illustrative of specific ways to make and use the invention and do not delimit the scope of the invention.

To facilitate the understanding of the embodiments described herein, a number of terms are defined below. The terms defined herein have meanings as commonly understood by a person of ordinary skill in the areas relevant to the present invention. Terms such as "a," "an," and "the" are not intended to refer to only a singular entity, but rather include the general class of which a specific example may be used for illustration. The terminology herein is used to describe specific embodiments of the invention, but their usage does not delimit the invention, except as set forth in the claims.

As used herein, "ballast" and "driver circuit" refer to any circuit for providing power (e.g., current) from a power source to a light source. Additionally, "light source" refers to one or more light emitting devices such as fluorescent lamps, high intensity discharge lamps, incandescent bulbs, and solid state light-emitting elements such as light emitting diodes (LEDs), organic light emitting diodes (OLEDs), and plasmaloids.

Figure 1:
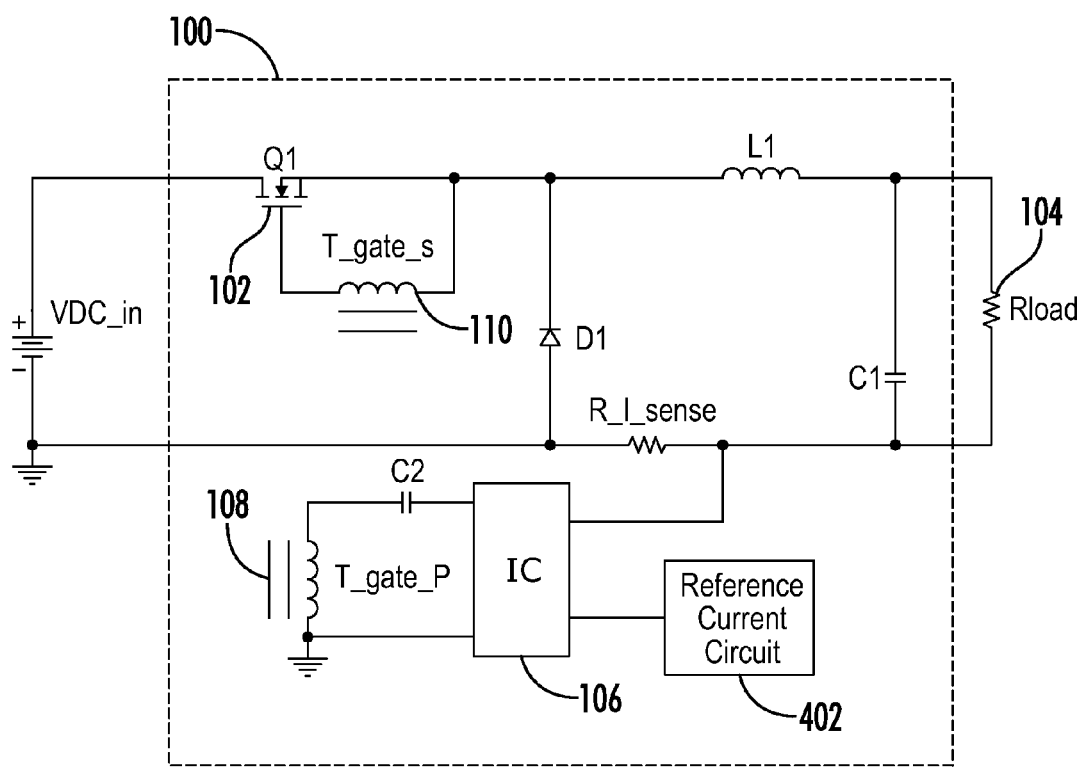
FIG. 1 is a schematic diagram of a prior art buck converter connected between the power source and a load.
Figure 2:
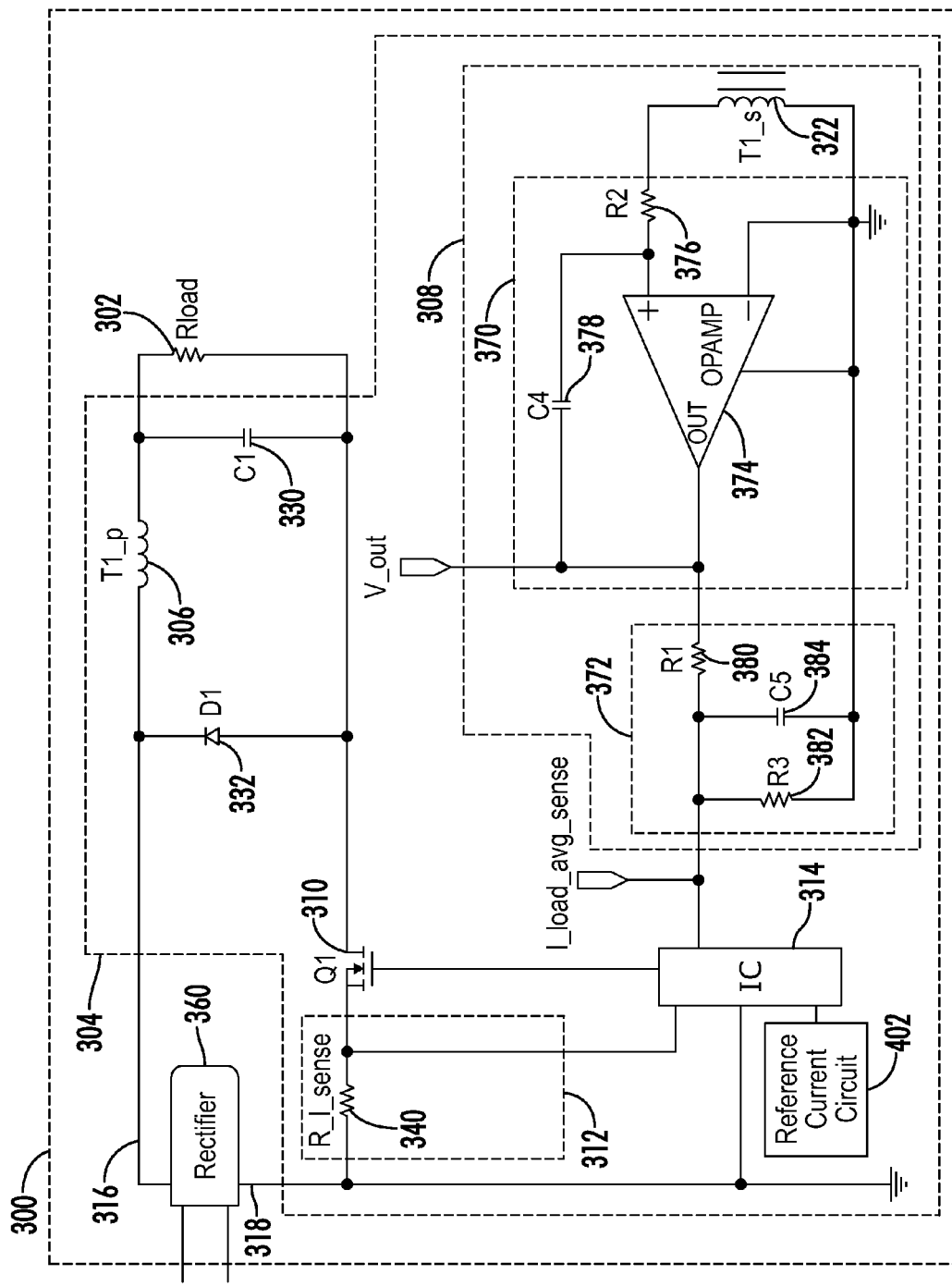
FIG. 2 is a schematic diagram of a light fixture operable to connect to a power source and provide light including a buck converter operable to provide a predetermined average current to a light source of the light fixture.

Referring to FIG. 2, a light fixture includes a housing 300, a light source 302, and a buck converter 304. The housing 300 supports the light source 302 and the buck converter 304. The light source 302 is operable to provide light in response to receiving current from the converter 304. The converter 304 is operable to provide a predetermined average current to the light source 302.

The converter 304 includes a primary inductor 306, a primary inductor current integrator circuit 308, a switch 310, and a controller 314. A load (e.g., light source 302) is coupled across first and second load terminals. The primary inductor 306 is connected between a positive input 316 of the converter 304 and the first load terminal. The primary inductor current integrator circuit 308 is operable to sense current through the primary inductor 306, provide a primary inductor current signal indicative of the current through the primary inductor 306, and induce, in the primary inductor 306, a current equal to an integral of the sensed current through the primary inductor 306. The switch 310 is connected between the light source 302 (via the second load terminal) and a ground input 318 of the converter 304. The controller 314 is operable to receive the primary inductor current signal and to control the switch 310 as a function of the primary inductor current signal. Controlling the switch 310 includes turning the switch 310 on and off. The switch 310 is operable to conduct current when turned on. The switch 310 is operable to substantially prevent current flow when turned off. In one embodiment, converter also includes a buck capacitor 330 connected in parallel with the load 302 and a buck diode 332 connected in parallel across the primary inductor 306 and the buck capacitor 330.

In one embodiment, the primary inductor 306 is a primary winding of a transformer. The primary inductor current integrator circuit 308 includes a secondary winding 322 of the transformer, an inverting integrator 370, and a resistive divider network 372. The integrator 370 is connected across the secondary winding 322 of the transformer. An output of the integrator 370 is referenced to the ground input 318 of the converter 304. The output of the inverting integrator 370 is connected to a primary inductor current input of the controller 314 via the resistive divider network 372. The resistive divider network 372 matches an output voltage range of the inverting integrator 372 to an input voltage range of the controller 314. Because the integrator 370 is inverting, the primary inductor current signal received at the controller 314 is inversely proportional to the current through the primary inductor 306. It is contemplated that a non-inverting integrator may also be used if the polarity of the secondary winding 322 is switched with respect to the polarity of the winding of the primary winding (i.e., the primary inductor 306) of the transformer.

In one embodiment, the integrator 370 is an op amp integrator including an op amp 374, an input resistor 376, and a feedback capacitor 378. The non-inverting input of the op amp 374 is connected to the secondary winding 322 via the input resistor 376, and an inverting input of the op amp 374 is connected to the ground input 318 of the converter 304. The op amp 374 is powered by a voltage regulator (not shown) within the converter 304. An output of the op amp 374 is connected to the non-inverting input of the op amp 374 by the feedback capacitor 378.

In one embodiment, the resistive divider network 372 includes a high resistor 380, a low resistor 382, and a filter capacitor 384. The high resistor 380 is connected between the output of the op amp 374 and the primary inductor current signal input of the controller 314. The low resistor 382 and the filter capacitor 384 are connected in parallel between the primary inductor current signal input of the controller 314 and the ground input 318 of the converter 304.

In one embodiment, the converter 304 also includes a switch current sensing circuit 312 effective to sense an instantaneous current through the switch 310 and provide an instantaneous current signal indicative of the sensed instantaneous current through the switch 310 to the controller 314. The switch current sensing circuit 312 includes a sensing resistor 340 connected between the switch 310 and the ground input 318 of the converter 304. The instantaneous current signal is a voltage of the current sensing resistor 340. In one embodiment, the controller determines the peak current through the switch 310 as a function of the instantaneous current signal provided by the switch current sensing circuit 312. As further explained below, components of the converter 304 may be selected such that the peak current is twice the average current through the load 302, enabling the controller 314 to determine and control the average current through the load 302.

In another embodiment, the controller 314 turns the switch 310 on when the primary inductor current signal indicates zero current through the primary inductor 306, and turns the switch 310 off a predetermined period of time after turning switch 310 on. The controller 314 then adjusts the predetermined period of time as a function of the average current through the light source 302 as determined from the instantaneous current signal as described above and/or as a function of the primary inductor current signal as further described below.

In another embodiment, the controller 314 is operable to determine a peak-to-peak value of the primary inductor current signal. The controller 314 controls the average current through the light source 302 as a function of the determined peak to peak value of the primary inductor current signal. That is, the peak-to-peak value of the primary inductor current signal is indicative of a peak current through the load 302 such that one-half of the determined peak current is the average current through the load 302. The controller 314 turns the switch 310 on when the primary inductor current signal indicates zero current through the primary inductor 306 and turns the switch 310 off a predetermined period of time after turning switch 310 on. The controller 314 then adjusts the predetermined period of time as a function of the average current through the light source 302 as determined from the instantaneous current signal and/or the primary inductor current signal.

In another embodiment, the controller 314 turns the switch 310 on when the primary inductor current signal indicates zero current through the primary inductor 306. The controller 314 then turns the switch 310 off when the primary inductor current signal indicates that the current through the primary inductor 306 is twice the predetermined average current.

The controller 314 includes a gate drive output connected directly to a control terminal of the switch 310. The controller 314 is operable to provide a gate drive signal via the gate drive output to the control terminal of the switch 310 to turn the switch 310 on and off. In one embodiment, the controller 314 is a critical conduction mode controller such as ST Microelectronics' ST L6562. The primary inductor 306 acts as a filter to reduce AC ripple of the current through the load 302, and the buck capacitor 330 acts as a filter capacitor.

In one embodiment, the converter 304 may also include a reference current circuit 402 operable to provide a reference current to a reference current input of the controller 314. In one embodiment, the reference current circuit 402 generates the reference current as a function of a dimming signal provided to the converter 304. In one embodiment, the dimming signal is derived by a dimming circuit of the light fixture as a function of a reduced AC line voltage provided to the light fixture. That is, the light fixture includes a circuit for determining the dimming signal and for providing a reference current corresponding to a dimming level indicated by the dimming signal. The controller 314 determines the predetermined average current as a function of the reference current at the reference current input of the controller 314. Thus, a change in the dimming signal (e.g., a change in the voltage of the AC line voltage) results in a corresponding change in the average current through the light source 302.

In one embodiment, the light source 302 may be a plurality of light emitting diodes connected in series with one another. In one embodiment, the housing 300 of the light fixture supports a plurality of converters 304 and a plurality of light sources 302, wherein each light source is connected to one of the plurality of converters. In one embodiment, the light fixture includes a rectifier 360 connected to the positive input 316 and the ground input 318 of the converter 304. The rectifier 360 is operable to receive alternating current line power and provide a direct current power source to the converter 304. It is contemplated that the rectifier 360 may provide a direct current power source to one or more converters 304 connected to one or more light sources 302.

Figure 3:
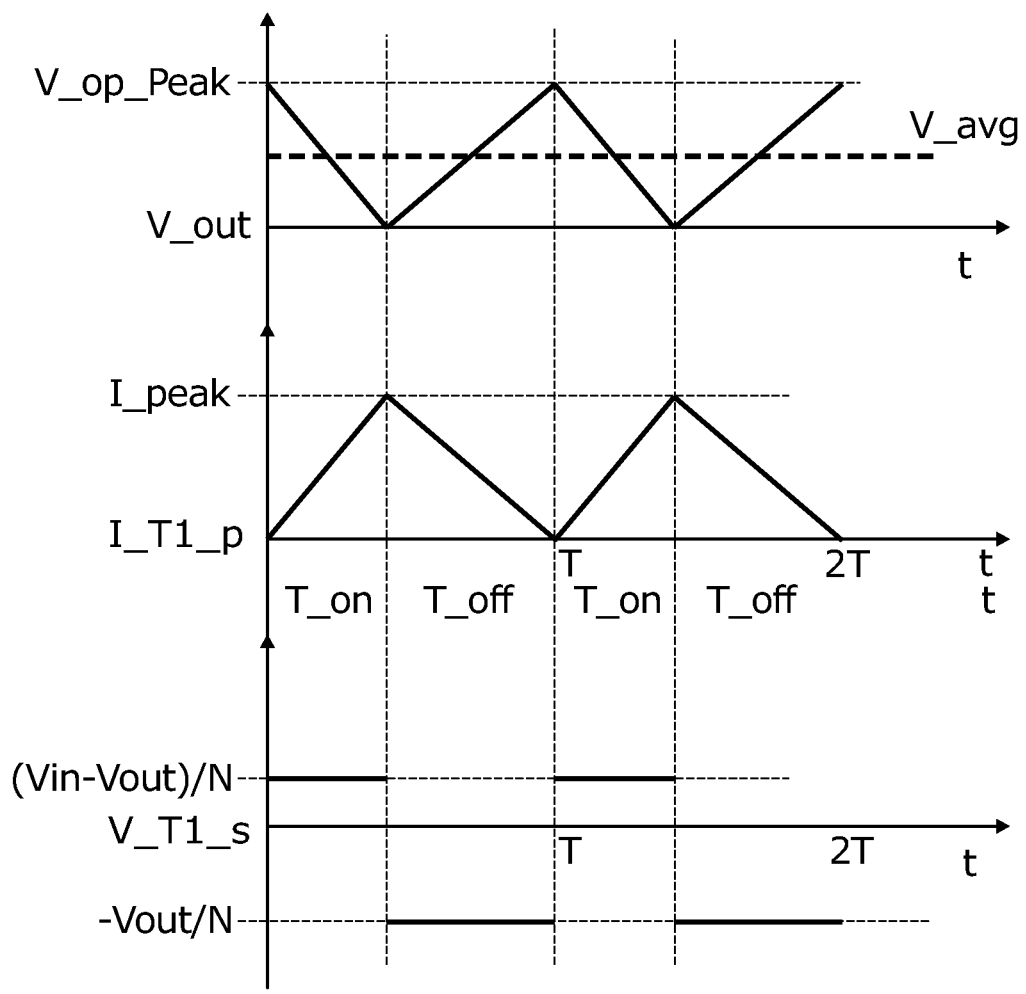
FIG. 3 is timing diagram of an output voltage of an inverting integrator of the converter, a current through a primary inductor of the converter, and a voltage of the secondary winding of the transformer of the primary inductor of the converter of FIG. 2.

Referring to FIG. 3, a timing diagram shows the output voltage of the inverting integrator 370 (which is proportional to the output of the resistive divider network 372), the current through the primary inductor 306, and a voltage of the secondary winding 322 for the converter 304 when operating in the critical conduction mode. The load current is the average current through the primary inductor 306. The current through the load 302 is expressed in Equation 1.

$$I_{load} = \tfrac{1}{2} I_{peak} \cdot T \cdot 1/T = \tfrac{1}{2} I_{peak} \qquad \text{EQUATION 1:}$$

The current through the load 302 is thus one-half of the peak current through the primary inductor 306. The current through the switch 310 is only part of the current through the primary inductor 306. However, because the peak current through the primary inductor 306 directly correlates to the current through the load 302, the current through the switch 310 can be used to regulate the current through the load 302. In one embodiment, the reference current is twice the predetermined average current through the load 302. Thus, the controller 314 turns the switch 310 on when the primary inductor current signal indicates zero current through the primary inductor 306 and turns the switch 310 off when instantaneous current signal indicates that the current through the switch 310 is twice the predetermined average current.

Components of the converter 304 should conform with certain specifications for the converter 304 to operate as described above. The relationship between the voltage and current of the primary inductor 306 is shown in Equation 2.

$$L \cdot \frac{di}{dt} = V \qquad \text{EQUATION 2}$$

The current through the primary inductor 306 can be derived by integration as shown in Equation 3.

$$\int \frac{V}{L} \cdot dt = i \qquad \text{EQUATION 3}$$

As shown in FIGS. 2 and 3, when the switch 310 is on, the voltage across the primary inductor is $V_{in} - V_{out\_load}$ wherein Vin is the voltage across the positive and ground inputs of the converter 304 and $V_{out\_load}$ is the voltage across the load 302. When the switch 310 is off, the voltage across the primary inductor 306 is $-V_{out\_load}$. Thus, when the switch 310 is on, the current through the primary inductor 306 is given by Equation 4, and when the switch 310 is off, the current through the primary inductor is given by Equation 5.

$$I_{peak} = \frac{V_{in} - V_{out\_load}}{L} \cdot T_{on} \qquad \text{EQUATION 4}$$

$$I_{peak} = \frac{V_{out\_load}}{L} \cdot T_{off} \qquad \text{EQUATION 5}$$

If the turns ratio between the primary inductor 306 and the secondary winding 322 is N, then the voltage across the secondary winding 322 is $(V_{in} - V_{out\_load})/N$ when the switch 310 is on, and $-V_{out\_load}/N$ when the switch 310 is off.

The relationship between the input voltage and the output voltage of the op amp 374 when the switch 310 is turned off is thus given by Equation 6.

$$\int_0^{T_{off}} \frac{V_{out}}{R2 \cdot C4 \cdot N} dt = I_{peak\_op} \qquad \text{EQUATION 6}$$

Simplifying Equation 6 gives Equation 7.

$$I_{peak\_op} = \frac{V_{out}}{R2 \cdot C4 \cdot N} \cdot T_{off} = V_{op\_peak} \qquad \text{EQUATION 7}$$

The relationship between the current and voltage of the op amp 374 is given by Equation 8 when the switch 310 is turned on.

$$I_{peak\_op} = \frac{V_{in} - V_{out}}{R2 \cdot C4 \cdot N} \cdot T_{on} = V_{\_op\_peak} \quad \text{EQUATION 8}$$

Comparing Equation 5 to Equation 7 (switch 310 off), and Equation 4 to Equation 8 (switch 310 on), it can be seen that when the inductance of the primary inductor 306 is equal to the product of the resistance of the input resistor 376 and the capacitance of the feedback capacitor 378, then the current through the primary inductor 306 can be maintained in a linear fashion by the primary inductor current integrator circuit 308. As shown in FIG. 3, the relationship between the average voltage and peak voltage of the output voltage of the op amp 374 is thus given by Equation 9.

$$V_{avg} = \frac{1}{2} \cdot V_{\_op\_peak} \quad \text{EQUATION 9}$$

Because the average current going through the load 302 (i.e., the light source) is the same average current going through the primary inductor 306, the average output voltage of the op amp 374 (and thus the average output voltage of the primary current integrator circuit 308) can be used to sensing control the average current through the load 302.

It will be understood by those of skill in the art that information and signals may be represented using any of a variety of different technologies and techniques (e.g., data, instructions, commands, information, signals, bits, symbols, and chips may be represented by voltages, currents, electromagnetic waves, magnetic fields or particles, optical fields or particles, or any combination thereof). Likewise, the various illustrative logical blocks, modules, circuits, and algorithm steps described herein may be implemented as electronic hardware, computer software, or combinations of both, depending on the application and functionality. Moreover, the various logical blocks, modules, and circuits described herein may be implemented or performed with a general purpose processor (e.g., microprocessor, conventional processor, controller, microcontroller, state machine or combination of computing devices), a digital signal processor ("DSP"), an application specific integrated circuit ("ASIC"), a field programmable gate array ("FPGA") or other programmable logic device, discrete gate or transistor logic, discrete hardware components, or any combination thereof designed to perform the functions described herein. Similarly, steps of a method or process described herein may be embodied directly in hardware, in a software module executed by a processor, or in a combination of the two. A software module may reside in RAM memory, flash memory, ROM memory, EPROM memory, EEPROM memory, registers, hard disk, a removable disk, a CD-ROM, or any other form of storage medium known in the art. Although embodiments of the present invention have been described in detail, it will be understood by those skilled in the art that various modifications can be made therein without departing from the spirit and scope of the invention as set forth in the appended claims.

A controller, processor, computing device, client computing device or computer, such as described herein, includes at least one or more processors or processing units and a system memory. The controller may also include at least some form of computer readable media. By way of example and not limitation, computer readable media may include computer storage media and communication media. Computer readable storage media may include volatile and nonvolatile, removable and non-removable media implemented in any method or technology that enables storage of information, such as computer readable instructions, data structures, program modules, or other data. Communication media may embody computer readable instructions, data structures, program modules, or other data in a modulated data signal such as a carrier wave or other transport mechanism and include any information delivery media. Those skilled in the art should be familiar with the modulated data signal, which has one or more of its characteristics set or changed in such a manner as to encode information in the signal. Combinations of any of the above are also included within the scope of computer readable media.

This written description uses examples to disclose the invention and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal languages of the claims.

It will be understood that the particular embodiments described herein are shown by way of illustration and not as limitations of the invention. The principal features of this invention may be employed in various embodiments without departing from the scope of the invention. Those of ordinary skill in the art will recognize numerous equivalents to the specific procedures described herein. Such equivalents are considered to be within the scope of this invention and are covered by the claims.

All of the compositions and/or methods disclosed and claimed herein may be made and/or executed without undue experimentation in light of the present disclosure. While the compositions and methods of this invention have been described in terms of the embodiments included herein, it will be apparent to those of ordinary skill in the art that variations may be applied to the compositions and/or methods and in the steps or in the sequence of steps of the method described herein without departing from the concept, spirit, and scope of the invention. All such similar substitutes and modifications apparent to those skilled in the art are deemed to be within the spirit, scope, and concept of the invention as defined by the appended claims.

Thus, although there have been described particular embodiments of the present invention of a new and useful A LOW COST CONSTANT CURRENT DRIVER BASED ON CRITICAL CONDITION MODE BUCK CONVERTER it is not intended that such references be construed as limitations upon the scope of this invention except as set forth in the following claims.

What is claimed is:

1. A buck converter operable to provide a predetermined average current to a load, said buck converter comprising:
   first and second load terminals;
   a primary inductor connected between a positive input of the converter and the first load terminal;
   a primary inductor current integrator circuit functional to sense current through the primary inductor,
      provide a primary inductor current signal indicative of the current through the primary inductor,
      induce, in the primary inductor, an integral of the sensed current through the primary inductor;
   a switch connected between the second load terminal and a ground input of the converter; and a controller operable to receive the primary inductor current signal and to control the switch as a function of the primary inductor current signal, wherein
controlling the switch comprises turning the switch on and off,
the switch is operable to conduct current through the switch when turned on, and
the switch is operable to substantially prevent current flow through the switch when turned off.

2. The converter of claim 1, further comprising:
a switch current sensing circuit effective to sense an instantaneous current through the switch and provide an instantaneous current signal indicative of the sensed instantaneous current through the switch to the controller;
the switch current sensing circuit comprises a sensing resistor connected between the switch and the ground input of the converter and the instantaneous current signal is a voltage of the current sensing resistor; and
the controller is further operable to receive the provided instantaneous current signal and control the switch as a function of the primary inductor current signal and the instantaneous current signal, wherein controlling the switch comprises
turning the switch on when the primary inductor current signal indicates zero current through the primary inductor, and
turning the switch off when the instantaneous current signal indicates that the current through the switch is twice the predetermined average current.

3. The converter of claim 1 wherein the controller is further operable to determine a peak-to-peak value of the primary inductor current signal and control the current through the load as a function of the determined peak to peak value of the primary inductor current signal,
wherein the controlling the switch comprises
turning the switch on when the primary inductor current signal indicates zero current through the primary inductor,
turning the switch off a predetermined period of time after turning the switch on, and
adjusting the predetermined period of time as a function of the determined peak to peak value of the primary inductor current signal.

4. The converter of claim 1, wherein controlling the switch comprises:
turning the switch on when the primary inductor current signal indicates zero current through the primary inductor; and
turning the switch off when the primary inductor current signal indicates a current through the primary inductor that is twice the predetermined average current.

5. The converter of claim 1, further comprising a reference current circuit operable to provide a reference current to a reference current input of the controller, wherein the controller is further operable to determine the predetermined average current as a function of the reference current.

6. The converter of claim 1 further comprising:
a transformer with the primary inductor comprising a primary winding of the transformer; and
the primary inductor current integrator circuit comprises
a secondary winding of the transformer,
an inverting integrator connected across the secondary winding of the transformer,
an output of the inverting integrator is referenced to the ground input of the converter, and
the output of the inverting integrator is connected to a primary inductor current input of the controller to provide the primary inductor current signal to the controller.

7. The converter of claim 1, wherein the primary inductor is a primary winding of a transformer, and the primary inductor current integrator circuit comprises:
a secondary winding of the transformer; and
an inverting integrator connected across the secondary winding of the transformer, wherein:
an output of the integrator is referenced to the ground input of the converter;
the output of the inverting integrator is connected to a primary inductor current input of the controller via a resistive divider network operable to match an output voltage range of the inverting integrator to an input voltage range of the controller; and
the primary inductor current signal is inversely proportional to the current through the primary inductor.

8. The converter of claim 1, wherein the controller comprises a gate drive output connected to a control terminal of the switch, wherein the controller is operable to provide a gate drive signal to the control terminal to turn the switch on and off.

9. A light fixture operable to connect to a power source and provide light, said light fixture comprising:
a housing;
a light source supported by the housing, said light source operable to provide light in response to receiving current;
a buck converter operable to provide a predetermined average current to the light source, said buck converter comprising
a primary inductor connected between a positive input of the converter and the light source,
a primary inductor current integrator circuit operable to sense current through the primary inductor,
provide a primary inductor current signal indicative of the current through the primary inductor, and
induce, in the primary inductor, an integral of the sensed current through the primary inductor,
a switch connected between the light source and a ground input of the converter; and
a controller operable to receive the primary inductor current signal and control the switch as a function of the primary inductor current signal, wherein
controlling the switch comprises turning the switch on and off,
the switch is operable to conduct current through the switch when turned on, and
the switch is operable to substantially prevent current flow through the switch when turned off.

10. The light fixture of claim 9, wherein the converter further comprises:
a switch current sensing circuit effective to sense an instantaneous current through the switch and provide an instantaneous current signal indicative of the sensed instantaneous current through the switch to the controller, wherein
the switch current sensing circuit comprises a sensing resistor connected between the switch and the ground input of the converter and the instantaneous current signal is a voltage of the current sensing resistor; and
the controller is further operable to receive the provided instantaneous current signal and control the switch as a function of the primary inductor current signal and the instantaneous current signal, wherein controlling the switch comprises:
   turning the switch on when the primary inductor current signal indicates zero current through the primary inductor; and
   turning the switch off when the instantaneous current signal indicates that the current through the switch is twice the predetermined average current.

11. The light fixture of claim 9, wherein the controller is further operable to determine a peak to peak value of the primary inductor current signal and control the average current through the light source as a function of the determined peak to peak value of the primary inductor current signal, wherein controlling the switch comprises:
   turning the switch on when the primary inductor current signal indicates zero current through the primary inductor; and
   turning the switch off a predetermined period of time after turning the switch on; and
   adjusting the predetermined period of time as a function of the determined peak to peak value of the primary inductor current signal.

12. The light fixture of claim 9, wherein controlling the switch comprises:
   turning the switch on when the primary inductor current signal indicates zero current through the primary inductor; and
   turning the switch off when the primary inductor current signal indicates a current through the primary inductor that is twice the predetermined average current.

13. The light fixture of claim 9, further comprising a reference current circuit operable to provide a reference current to a reference current input of the controller, wherein the controller is further operable to determine the predetermined average current as a function of the reference current.

14. The light fixture of claim 9, wherein the primary inductor is a primary winding of a transformer, and the primary inductor current integrator circuit comprises:
   a secondary winding of the transformer; and
   an inverting integrator connected across the secondary winding of the transformer, wherein:
      an output of the integrator is referenced to the ground input of the converter; and
      the output of the integrator is connected to a primary inductor current input of the controller to provide the primary inductor current signal to the controller.

15. The light fixture of claim 9, wherein the primary inductor is a primary winding of a transformer, and the primary inductor current integrator circuit comprises:
   a secondary winding of the transformer; and
   an inverting integrator connected across the secondary winding of the transformer, wherein:
      an output of the integrator is referenced to the ground input of the converter;
      the output of the inverting integrator is connected to a primary inductor current input of the controller via a resistive divider network operable to match an output voltage range of the inverting integrator to an input voltage range of the controller; and
      the primary inductor current signal is inversely proportional to the current through the primary inductor.

16. The light fixture of claim 9, wherein:
   the controller comprises a gate drive output connected to a control terminal of the switch, wherein the controller is operable to provide a gate drive signal to the control terminal to turn the switch on and off;
   the light source comprises a plurality of light emitting diodes connected in series with one another; and
   the light fixture further comprises a rectifier connected to the positive input and the ground input of the converter, wherein the rectifier is operable to receive alternating current line power and provide a direct current power source to the converter.

17. A method of providing a predetermined average current to a load, said method comprising:
   sensing, via a primary inductor integrator circuit, a current through a primary inductor of a buck converter connected to the load, wherein the primary inductor is connected between a positive input of the converter and the load;
   providing a primary inductor current signal indicative of the current through the primary inductor from the primary inductor integrator circuit to a controller of the converter;
   inducing, via the primary inductor integrator circuit, an integral of the sensed current through the primary inductor in the primary inductor;
   receiving the primary inductor current signal at the controller; and
   controlling a switch of the converter via the controller as a function of the primary inductor current signal, wherein:
      controlling the switch comprises turning the switch on and off;
      the switch is operable to conduct current through the switch when turned on; and
      the switch is operable to substantially prevent current flow through the switch when turned off.

18. The method of claim 17, further comprising:
   sensing an instantaneous current through the switch via a switch current sensing circuit;
   providing an instantaneous current signal from the switch current sensing circuit to the controller indicative of the sensed instantaneous current through the switch, wherein the switch current sensing circuit comprises a sensing resistor connected between the switch and the ground input of the converter and the instantaneous current signal is a voltage of the current sensing resistor; and
   receiving the provided instantaneous current signal at the controller; and
   controlling, via the controller, the switch as a function of the primary inductor current signal and the instantaneous current signal, wherein controlling the switch comprises:
      turning the switch on when the primary inductor current signal indicates zero current through the primary inductor; and
      turning the switch off when the instantaneous current signal indicates that the current through the switch is twice the predetermined average current.

19. The method of claim 17, further comprising:
   determining, via the controller, a peak to peak value of the primary inductor current signal; and
   controlling, via the controller, the average current through the load as a function of the determined peak to peak value of the primary inductor current signal, wherein controlling the switch comprises:
      turning the switch on when the primary inductor current signal indicates zero current through the primary inductor; and
      turning the switch off a predetermined period of time after turning the switch on; and adjusting the predetermined period of time as a function of the determined peak to peak value of the primary inductor current signal.

20. The method of claim 17, wherein controlling the switch comprises:
   turning the switch on when the primary inductor current signal indicates zero current through the primary inductor; and
   turning the switch off when the primary inductor current signal indicates a current through the primary inductor that is twice the predetermined average current.

* * * * *